Patented July 6, 1926.

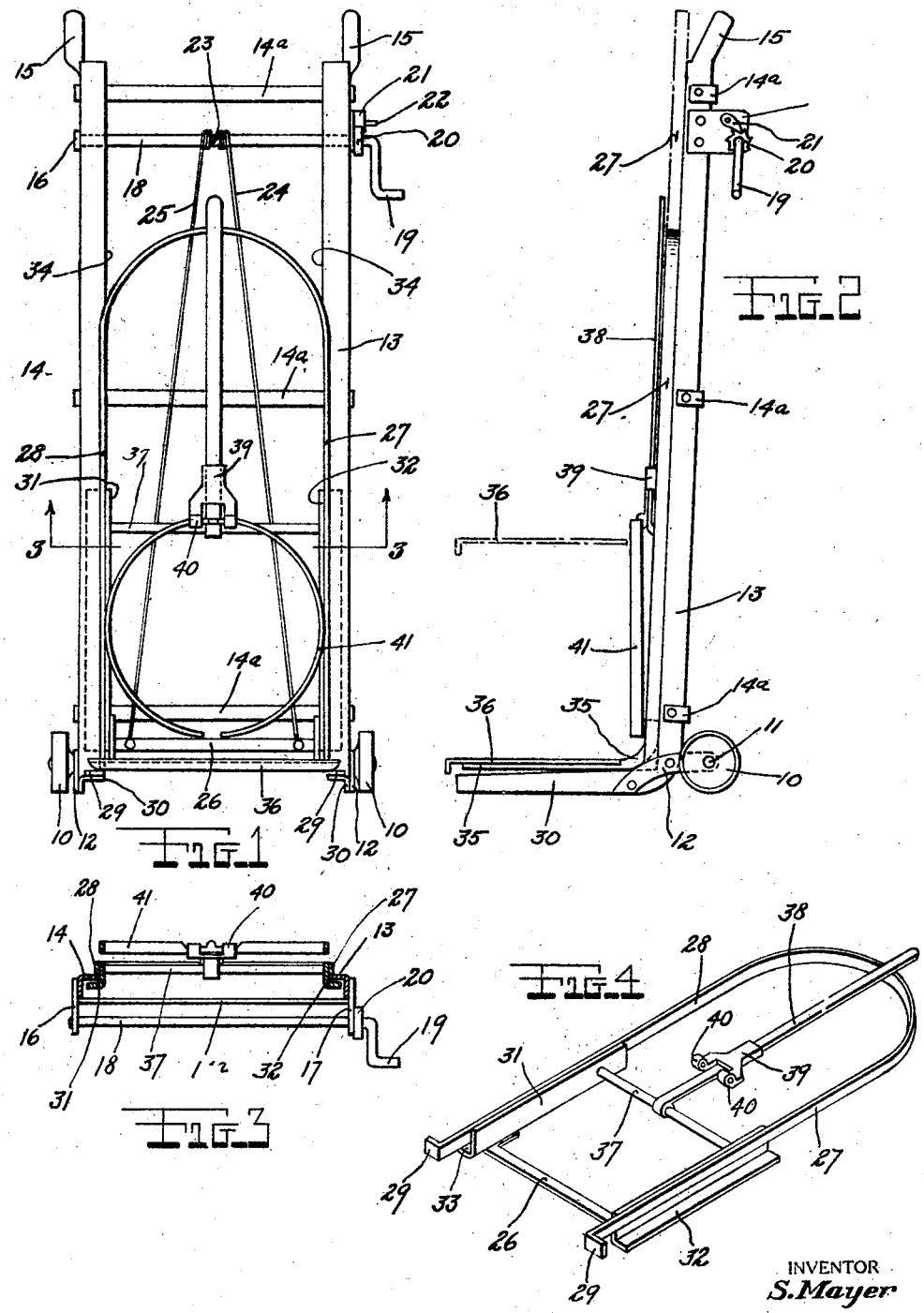

1,591,766

UNITED STATES PATENT OFFICE.

SIGMUND MAYER, OF NEW YORK, N. Y.

HAND TRUCK.

Application filed July 25, 1925. Serial No. 46,132.

The main object of this invention is to provide a hand truck used in transporting articles of bulk from one location to another, the truck being made adaptable for barrels and cases of any size, the height of the barrel being accommodated by an adjustable hoop girdle.

Another object is to provide a hand truck in which the carrying platform of the truck may be lifted to any desired height in order to permit transporting of the article carried from one level to a higher level.

These and other objects will become apparent in the description below, in which characters of reference refer to like-named parts in the drawing.

Referring briefly to the drawing, Figure 1 is a front elevational view of the hand truck, showing the platform in its lowered position.

Figure 2 is a side elevational view of the the same, in which the platform is indicated in dotted lines in lifted position, and in full lines in lowered position.

Figure 3 is a cross-sectional view taken on line 3—3 of Figure 1, showing the construction of the platform carriage.

Figure 4 is a perspective view of the platform carriage, per se.

Referring in detail to the drawing, the numeral 10 indicates the wheels of the truck. These wheels are mounted rigidly on a shaft 11 which is journalled in curved arms 12. The latter are rigidly attached to side frames 13 and 14 by suitable rivets. These side frames of the hand truck are retained in permanent spaced-apart relation by cross braces 14ª. The side frames are substantially L-shaped in cross section, the vertices of the intersecting sides facing toward the front of the truck. The upper ends of the side frames 13 and 14 are bent and curved into handle bars 15. An ear 16 is rigidly mounted to the side frame 14 near its upper end, and a similar ear 17 of larger proportions extends rearward from the side frame 13. These ears 16 and 17 rotatably support a winding shaft 18, the end thereof which extends from the ear 17 being formed into a crank handle 19. On the crank handle end of the shaft, and adjacent the outer face of the ear 17, a ratchet wheel 20 is mounted. Above this ratchet wheel, a pawl 21 is pivoted on the ear 17 and engages the teeth of the ratchet wheel. A small stud 22, projecting from the side of the pawl, is used in manipulating the same. Centrally of the length of the shaft 18, an anchoring bolt 23 is mounted, to which the ends of flexible cables 24 and 25 are attached. These cables extend downwardly from the shaft, and the lower ends are permanently secured to a brace bar 26. The brace bar forms part of the platform carriage comprising a continuous strap curved at its upper end semi-circularly in order to provide parallel straps 27 and 28, the straps having feet 29 provided at their lower ends which extend outwardly and are supported on the angularly extending ends of the side frames 13 and 14 when the carriage is in position of rest. Guide frames 31 and 32 are rigidly attached to the inner surfaces of the straps 27 and 28 near the lower ends thereof in such manner that a space 33 is left of sufficient depth to permit the thickness of the internal edges 34 to be inserted therein. Angular arms 35 are attached to the adjacent faces of members 31 and 32 and are bent so as to provide flat surfaces upon which a platform 36 may be mounted, this platform forming a portion rigid with the entire carriage. Near the upper ends of the guide frames 31 and 32, a support bar 37 spans the intevening distance between the two frames and provides an anchoring means for a vertically disposed slide guide bar 38 on which a bracket 39 is slidable. Said bracket is provided with bosses 40 in which a reduced portion of a barrel girdle 41 is rotatably mounted.

The hand truck is used in the ordinary manner, that is, an article of bulk is placed upon the platform 36 when the hand truck is in the position shown in Figure 2. By grasping the handle bars 15, the truck is tilted so that the same is supported upon the wheels 10 in which position it may be rolled to any desired location. When such articles as barrels are to be carried upon the platform, the girdle 41 is rotated outwardly, and is lifted to accommodate the height of the barrel, this being accomplished by sliding member 39 upwardly on the guide bar 38. When it is desired to lift the article being transported from a lower level to a higher level, the crank 19 is rotated so that the cables 24 and 25 are wound upon the shaft 18, these cables having their lower ends attached to the brace bar 26 causing the entire platform carriage to be lifted, the carriage being guided in an upward path as the portions 33 receive the edges 34 of the rigid side frames 13 and 14. When the desired height has been arrived at, the pawl 21 engages the teeth of the ratchet wheel 20 and locks the platform and slide carriage at the desired level. In order to release the carriage so that it will automatically fall to its lower level, the stud 22 is lifted, thus disengaging the pawl from the ratchet, thereby permitting the shaft 18 to rotate in an opposite direction.

I claim:—

1. A hand truck comprising rigid side frames, braces spacing said side frames apart, the side frames being substantially L-shaped in cross section, the lower end of said side frames being bent angularly, a shaft at the upper ends of said side frames, means for rotating said shaft, means for locking said shaft in any desired position, a slide carriage between said side frames, a platform forming part of said slide carriage and wheels at the lower end of said side frames for supporting the same.

2. A hand truck comprising spaced-apart side frames, the side frames being substantially L-shaped in cross section, a shaft between said side frames, a crank on said shaft, a ratchet wheel on said shaft, a pawl engaging said ratchet for locking the shaft against rotation in one direction, a slide carriage, said slide carriage comprising parallel straps, guide frames attached to said straps, said guide frames and straps forming a channel therebetween, the edges of the side frames being adapted to register in said channels, a hoop girdle, means for permitting adjustment of said hoop girdle, and a platform rigid with the slide carriage at the lower end thereof.

In testimony whereof I affix my signature.

SIGMUND MAYER.